US007559965B2

(12) United States Patent
Oh et al.

(10) Patent No.: US 7,559,965 B2

(45) Date of Patent: Jul. 14, 2009

(54) CYCLONIC SEPARATING APPARATUS FOR VACUUM CLEANER WHICH IS CAPABLE OF SEPARATELY COLLECTING WATER FROM DUST

(75) Inventors: Jang-keun Oh, Gwangju (KR); Min-ha Kim, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 591 days.

(21) Appl. No.: 11/326,216

(22) Filed: Jan. 5, 2006

(65) Prior Publication Data

US 2006/0162298 A1 Jul. 27, 2006

(30) Foreign Application Priority Data

Jan. 25, 2005 (KR) ...................... 10-2005-0006524
Apr. 20, 2005 (KR) ...................... 10-2005-0032835

(51) Int. Cl.
*B01D 45/12* (2006.01)

(52) U.S. Cl. ............................ 55/424; 55/429; 55/452; 55/459.1

(58) Field of Classification Search ................... 55/424, 55/429, 452, 459.1
See application file for complete search history.

(56) References Cited

U.S. PATENT DOCUMENTS 1,878,052 A 9/1932 Wilson et al.
3,251,176 A * 5/1966 Gleason ....................... 55/355
3,898,068 A 8/1975 McNeil ....................... 55/426
5,779,746 A 7/1998 Buchanan et al. ............. 55/452

FOREIGN PATENT DOCUMENTS

| | | |
|---|---|---|
| CN | 1178622 C | 12/2004 |
| DE | 19938774 | 3/2001 |
| GB | 2019748 | 4/1979 |
| JP | 09234174 | 9/1997 |
| JP | 2001-346733 | 12/2001 |
| JP | 2003024826 | 1/2003 |
| KR | 1020040017195 | 2/2004 |
| WO | WO02/24299 A1 | 3/2002 |
| WO | WO03030702 | 4/2003 |

OTHER PUBLICATIONS

Official Action dated Mar. 29, 2006 issued from the Korean Intellectual Property Office with respect to Korean Patent Application No. 2005-32835 filed Apr. 20, 2005.
Extended European Search Report dated Sep. 5, 2006 issued in respect to corresponding European Patent Application No. 06290113.7 filed on Jan. 17, 2006.
Office Action dated Sep. 14, 2007 corresponding to Chinese Patent Application No. 200610005154.5.

* cited by examiner

*Primary Examiner*—Robert A Hopkins
(74) *Attorney, Agent, or Firm*—Ohlandt, Greeley, Ruggiero & Perle, L.L.P.

(57) ABSTRACT

A cyclonic separating apparatus for a vacuum cleaner that can separately collect dust and water. The cyclonic separating apparatus includes: a cyclone body having an air inlet passage and an air discharge passage; a dust receptacle connected to a lower end of the cyclone body; and a screen dividing the cyclone body and interior space of the dust receptacle into a first chamber and a second chamber, the screen having a plurality of passing holes, wherein drawn air rotates in the first chamber and water separated from the air moves to the second chamber through the passing holes.

12 Claims, 6 Drawing Sheets

CYCLONIC SEPARATING APPARATUS FOR VACUUM CLEANER WHICH IS CAPABLE OF SEPARATELY COLLECTING WATER FROM DUST

CROSS-REFERENCE TO RELATED APPLICATIONS

This application claims the benefit of Korean Patent Application No. 2005-06524 and 2005-32835 filed Jan. 25, 2005, and Apr. 20, 2005, respectively, in the Korean Intellectual Property Office. The entire contents of each of the above mentioned applications is incorporated herein by reference.

BACKGROUND OF THE INVENTION

1. Field of the Invention

The present invention relates to a vacuum cleaner. More particularly, the present invention relates to a cyclonic separating apparatus for a vacuum cleaner, which is capable of separately collecting water and dust from air.

2. Description of the Related Art

Generally, a cyclonic separating apparatus of a vacuum cleaner collects contaminants from a place being cleaned, and the collected contaminants usually include both water and dust. The problem is fungus and/or germs frequently grow due to the presence of water with the collected contaminants. Additionally, when a paper bag is employed in the dust separating apparatus, the paper bag is prone to get wet and rupture. In the case of a cyclone dust separating apparatus, separated water may flow backward with the discharging air current, clogging various filters such as an exhaust filter. Accordingly, there is an increasing demand for a cyclonic separating apparatus which can separate water and dust into different chambers.

In the same context as the problem described above, the cyclonic separating apparatus of a vacuum cleaner collects both minute contaminants and larger contaminants in one place. Accordingly, due to the light weight of the separated minute contaminants, these contaminants may flow backward with the discharging air current, clogging various filters such as an exhaust filter. Accordingly, there is an increasing demand for a cyclonic separating apparatus which can separate minute contaminants and larger contaminants into different chambers.

SUMMARY OF THE INVENTION

The present invention has been developed in order to solve the above drawbacks and other problems associated with the conventional arrangement. An aspect of the present invention is to provide a cyclonic separating apparatus which is capable of separating water and minute contaminants from relatively larger contaminants in a separated chamber.

It is a second object of the present invention to provide a cyclonic separating apparatus which provides high separation efficiency of both water and minute contaminants.

It is a third object of the present invention to provide a cyclonic separating apparatus which is capable of preventing dispersion and subsequent backflow of both water and minute contaminants once separated.

It is a fourth object of the present invention to provide a cyclonic separating apparatus in which the amount of separated water or contaminants can be easily checked.

The above aspects and/or other features of the present invention can substantially be achieved by a cyclonic separating apparatus, which includes a cyclone body having an air inlet passage and an air discharge passage, a dust receptacle connected to a lower end of the cyclone body; and a screen dividing the cyclone body and interior space of the dust receptacle into a first chamber and a second chamber, and the screen having a plurality of passing holes. Drawn air rotates in the first chamber and water separated from the air moves to the second chamber through the passing holes.

The screen is a cylindrical container, and the passing holes are inclined in the direction of rotation of the drawn air. The screen is surrounded by the cyclone body. At least one of the passing holes forms an elliptical shape. The screen may be divided into sections. Center lines of at least two passing holes disposed in the same section are parallel to each other, a formation area of the passing holes of the screen begins from the joining area between the cyclone body and the dust receptacle, and ends at the location of an inlet port of the air inlet passage.

The uppermost part of the screen is in a funnel shape with an increasing inner diameter in the upward direction. The screen includes an upper part where the passing holes are formed, and a lower part where the passing holes are not formed.

At least one guide member may be further provided to partition the second chamber of the dust receptacle so as to restrict rotation, dispersion, and subsequent backflow of the water once the water is separated into the second chamber.

The screen may have at least one opening at the lower part, and at least one backflow prevention member formed on the boundary of the opening so that water may not flow into the first chamber. The dust receptacle may be at least partially formed of a transparent material.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE INVENTION

Figure 1:
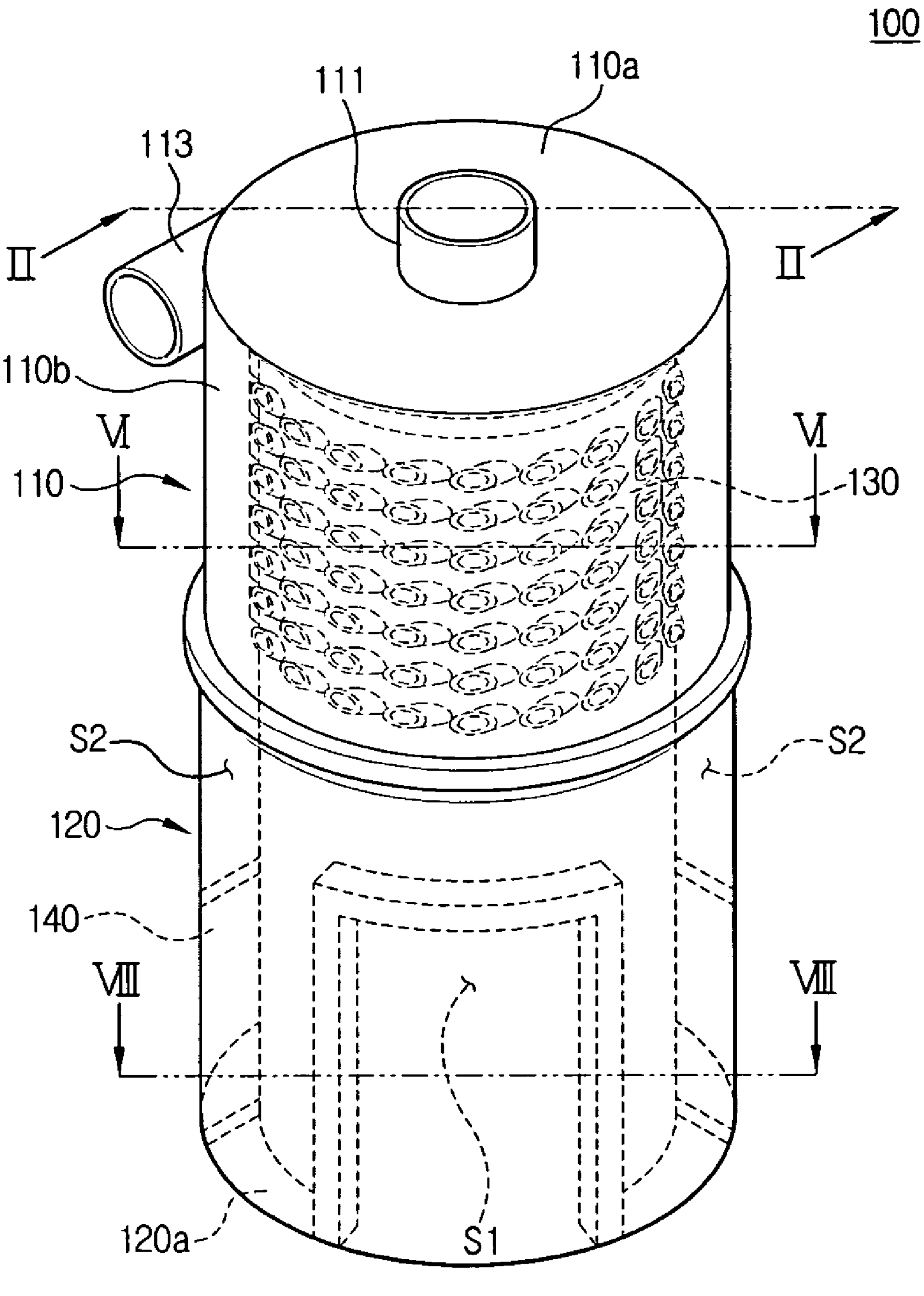
FIG. 1 is a perspective view of a cyclonic separating apparatus according to an exemplary embodiment of the present invention.

Certain embodiments of the present invention will now be described in greater detail with reference to the accompanying drawings.

In the following description, the same drawing reference numerals are used for the same elements throughout the drawings. Also, well-known functions or constructions are not described in detail since they would obscure the invention in unnecessary detail.

Referring to FIG. 1, a cyclonic separating apparatus 100 according to an embodiment of the present invention includes a cyclone body 110, a dust receptacle 120, a screen 130 and a guide member 140.

The cyclone body 110 takes on the configuration of a cylindrical container in which dust and water are separated from the drawn air by centrifugal force. The cyclone body 110 includes an air discharge passage 111 on its upper side 110*a* through which clean air, free of water and dust, is discharged. The air discharge passage 111 may take on the configuration of a cylindrical pipe, which is usually welded or attached to the upper side 110*a* of the cyclone body 110. The air discharge passage 111 extends a predetermined depth inside the cyclone body 110, with a grill 112 (see FIG. 2) disposed around the inserted part of the air discharge passage 111. There is a skirt 105 (see FIG. 2) disposed on the lower side of the grill 112 (see FIG. 2) to prevent separated dust from flowing back.

The cyclone body 110 also has an air inlet passage 113 on its circumferential surface 110*b* through which dust and water-laden air is drawn in. The air inlet passage 113 is formed in a lateral direction so that the air can turn into cyclone current when it passes through the air inlet passage 113. The air inlet passage 113 takes on the configuration of a cylindrical pipe, and may be welded or attached to the circumferential surface 110*b* of the cyclone body 110. The air inlet passage 113 extends inside the cyclone body 110, with an inlet port 113*a* (see FIG. 2) formed at the terminal end of the air inlet passage 113. Accordingly, external air, laden-with dust and water, is drawn through the air inlet passage 113 and the inlet port 113*a* (see FIG. 2) into the interior of a first chamber by centrifugal force.

The dust receptacle 120 is a cylindrical container which is employed to separate dust and water. The dust receptacle 120 may be fit in the cyclone body 110, or alternatively, for a firmer connection, the dust receptacle 120 may be connected with the cyclone body 110 by screws or hooks.

Since the dust receptacle 120 is removable from the cyclone body 110, it is easy to empty the dust receptacle 120. In other words, it is easy to remove the dust receptacle 120 from the cyclone body 110 and turn the dust receptacle 120 upside down, letting the separated water and dust pour out.

The screen 130 is a cylindrical shielding layer disposed inside the cyclonic separating apparatus 100. The screen 130 may be attached to, or firmly inserted in a bottom side 120*a* of the dust receptacle 120. Due to the presence of the screen 130, the interior space of the cyclonic separating apparatus 100, which is defined by the cooperation of the cyclone body 110 and the dust receptacle 120, can be divided into a first chamber S1 and a second chamber S2.

Figure 2:
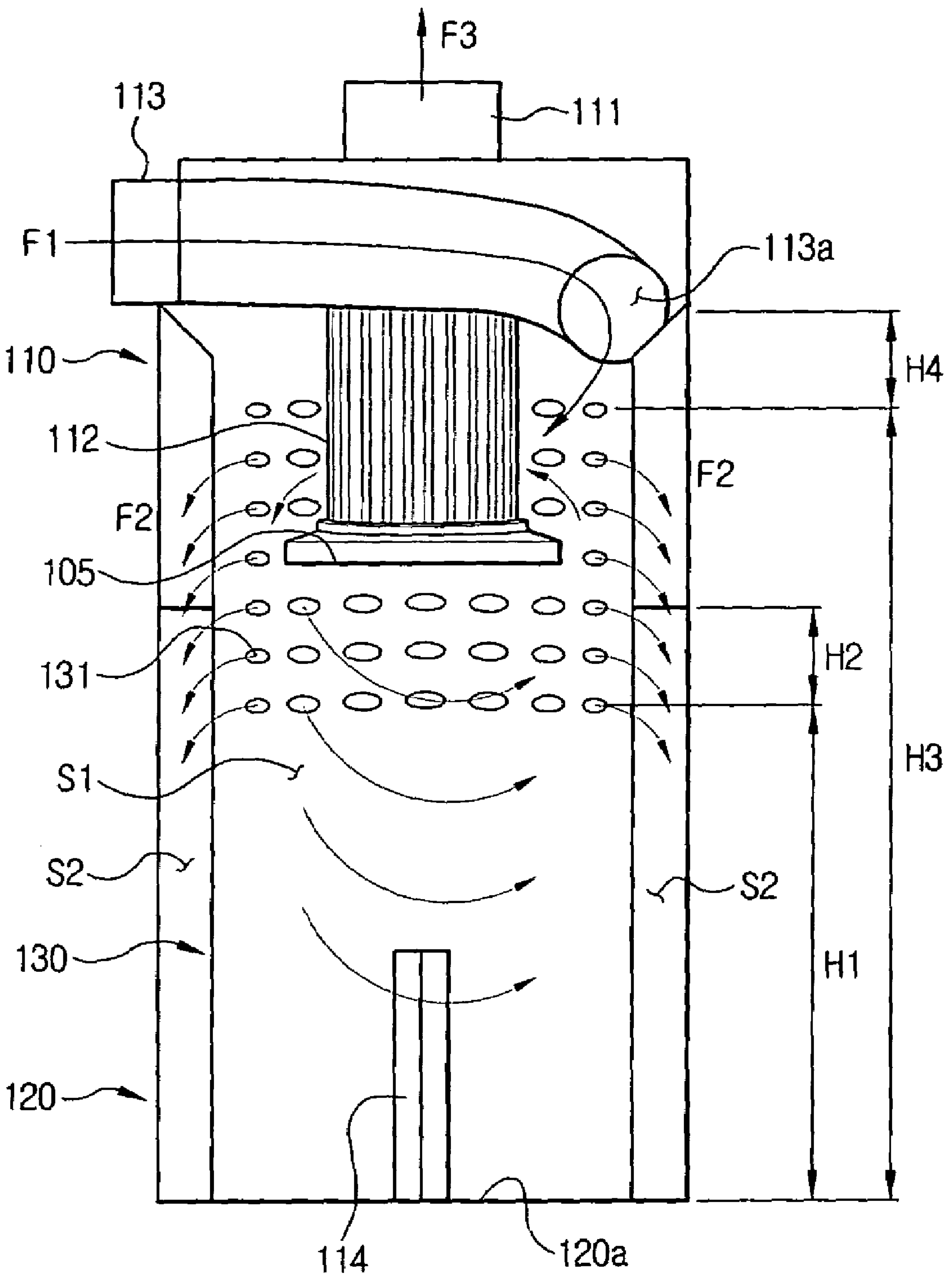
FIG. 2 is a cross-sectional view taken along line II-II of FIG. 1.

Referring to FIG. 2, the first chamber S1 is a place where the external air, laden with dust and water, is drawn in through the inlet port 113*a* and the dust is separated from the drawn air by centrifugal force. The first chamber S1 has a flow prevention member 114 at the center of the bottom 120*a*, to prevent movement of the separated dust. The second chamber S2 is a space which circumferentially surrounds the first chamber S1. The second chamber S2 contains therein both water and minute contaminants which are passed through the passing holes 131 in the direction of arrow F2.

Figure 3:
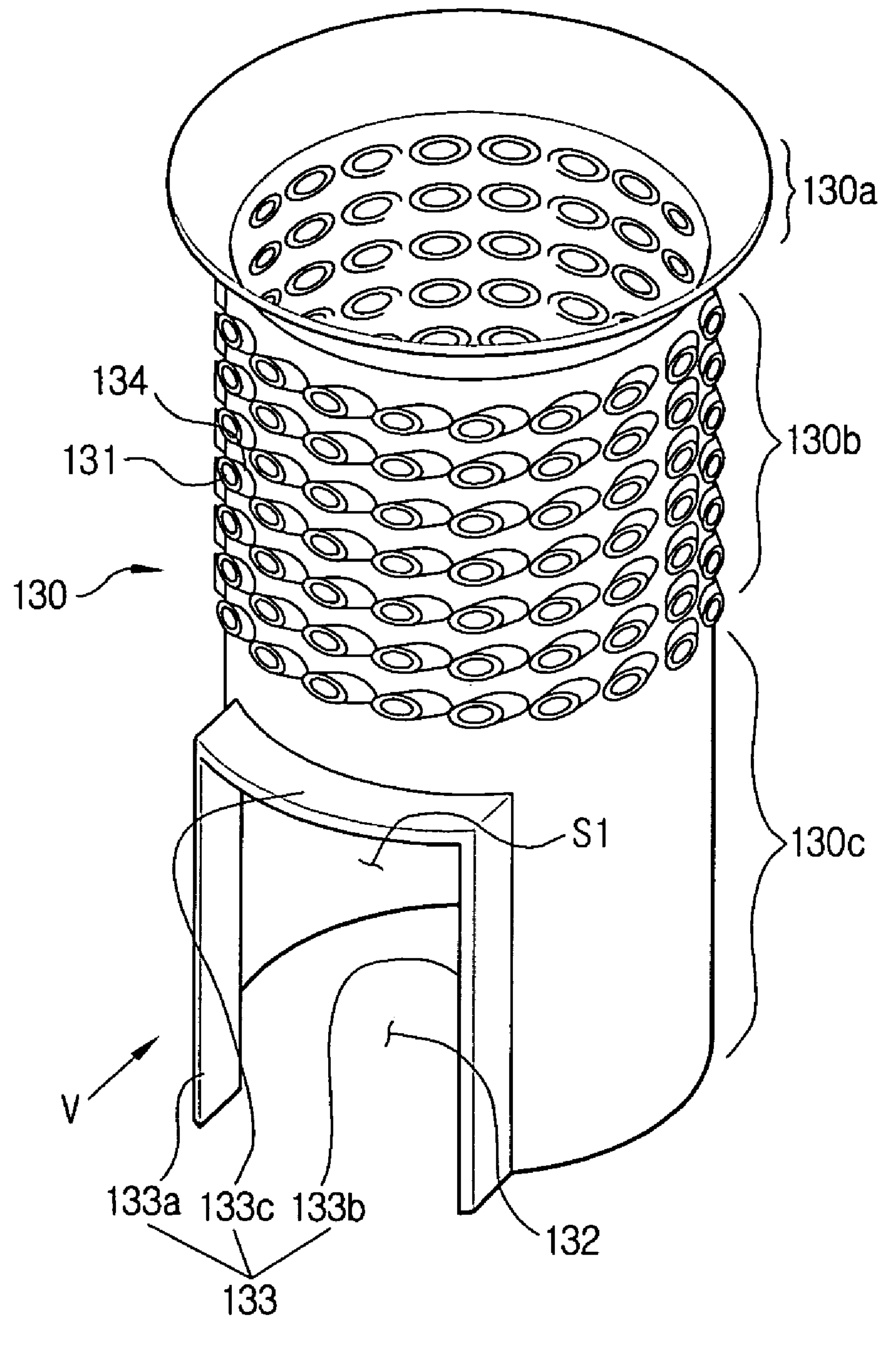
FIG. 3 is a perspective view of a screen of the cyclonic separating apparatus of FIG. 1.

Referring to FIGS. 2 and 3, an uppermost part 130*a* of the screen 130 takes on the configuration of a funnel which has a gradually increasing inner diameter in the upward direction. By such a configuration of the screen 130, the upper part of the second chamber S2 is sealingly covered.

A plurality of passing holes 131 are formed in an upper part 130*b* of the screen 130. The passing holes 131 are formed at a predetermined height Hi so that separated water does not flow back into the first chamber S1 as the amount of separated water increases. It is preferable that the passing holes 131 are formed to the height H3 which corresponds to the lower side of the inlet port 113*a* so as to ensure that as many passing holes 131 as possible are formed. More specifically, the formation area for the passing holes 131 may begin within a distance H2 from the location where the cyclone body 110 and the dust receptacle 120 are joined (see FIG. 2), and end within a distance H4 from the inlet port 113*a* (see FIG. 2). In one preferred embodiment, the distances H2 and H4 are approximately 3 cm (centimeters), respectively.

Figure 4:
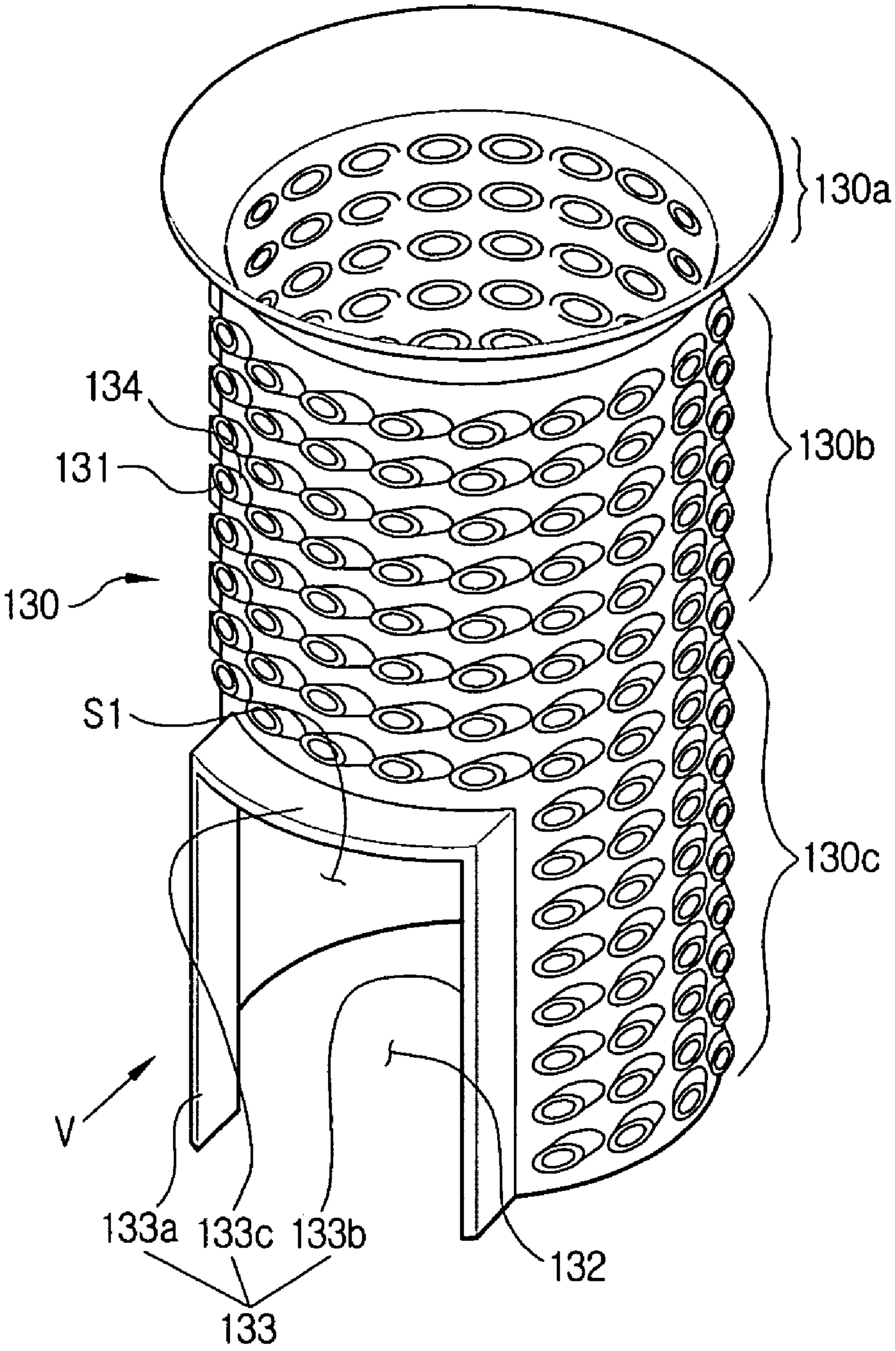
FIG. 4 is a perspective view of an alternate exemplary embodiment of a screen for use with a cyclonic separating apparatus of the present invention.

However, if priority is placed on the separation of minute contaminants rather than water, an alternative embodiment of the screen allows for an extension of the formation area of the passing holes 131, as shown in FIG. 4. In this alternative embodiment, the formation area ends at a lower side 130*c* of the screen 130, although the water flows into the second chamber S2 through the passing holes 131. At this time, more minute contaminants are separated in the second chamber S2 through the passing holes 131. As a result, high separation efficiency of minute contaminants can be achieved.

The passing holes 131 are formed inside the cylindrical pipe 134 on the circumference of the screen 130. The cylindrical pipe 134 is formed with the screen 130 in a single body. Alternatively, separately-manufactured pipes may be welded or attached to the screen 130, if needed.

Figure 5:
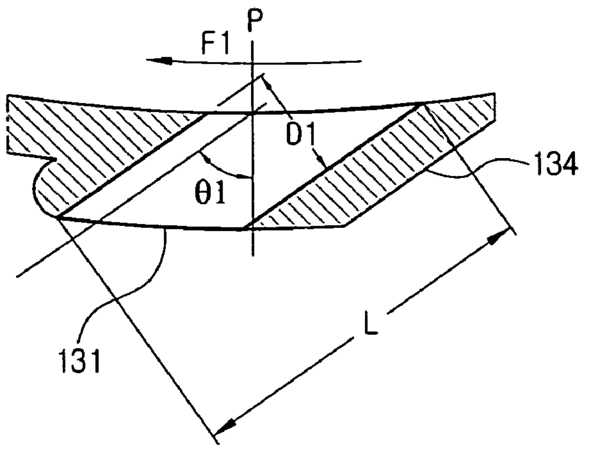
FIG. 5 is a cross-sectional view of a passing hole of the screen of FIG. 3.

Referring to FIG. 5, each passing hole 131 of the cylindrical pipe 134 is inclined at a predetermined angle θ1 with respect to a substantially vertical axis P in the same direction as that of the rotating air (arrow F1). By inclining each passing hole 131 of the cylindrical pipe 134 at an angle θ1, both water and minute contaminants can smoothly pass through the passing holes 131.

As shown in FIG. 5, the passing holes 131 extend a predetermined distance L through the inclined cylindrical pipe 134. The angle θ1 makes it difficult for the once-passed water and minute contaminants to be passed back through the inclined passing holes 131 and flow backward to the first chamber S1 from the second chamber S2.

The passing holes 131 are sized in a proper manner. As shown in FIG. 5, the width D1 of each passing hole 131 is large enough to allow the passage of minute contaminants but small enough to prevent the passage of larger contaminants. That is, both water and minute contaminants may not pass through the passing holes 131 when the passing holes 131 are sized too narrow, while larger contaminants may also pass through the passing holes 131 when the passing holes 131 are sized too wide.

Figure 6:
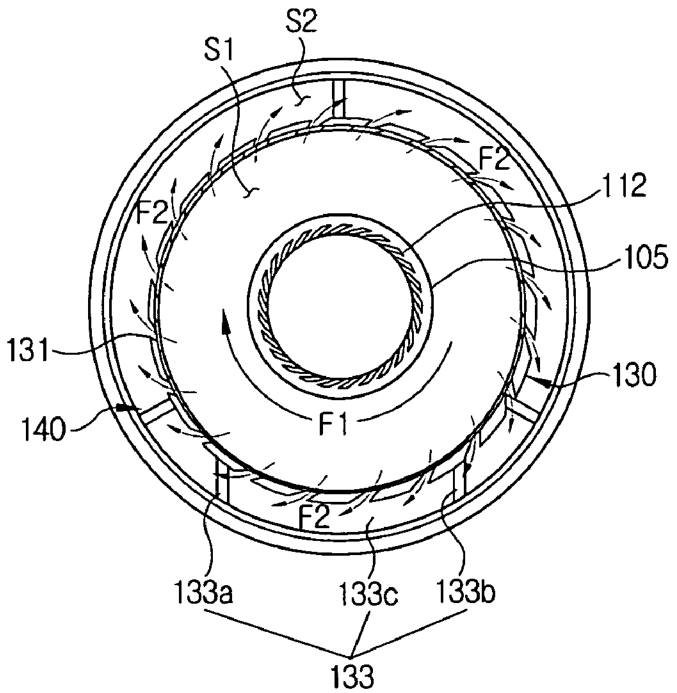
FIG. 6 is a plan view taken along line VI-VI of FIG. 1.
Figure 7:
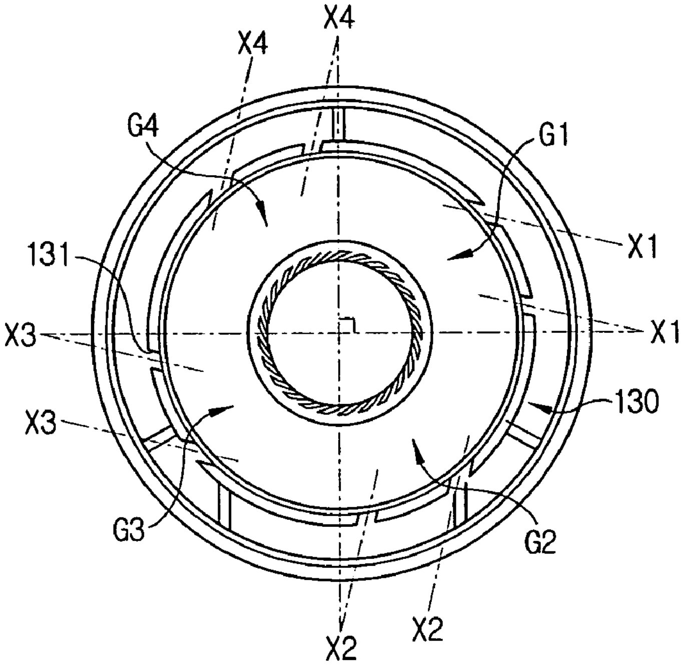
FIG. 7 is a plan view of another exemplary embodiment of a screen for use with a cyclonic separating apparatus of the present invention.

Referring to FIG. 6, the plurality of passing holes 131 is arranged on the circumference of the screen 130. In an alternate embodiment shown in FIG. 7, the screen 130 is divided into 4 sections G1, G2, G3, G4 at an angle of 90 degrees and each section G1, G2, G3, G4 can be arranged with 2 passing holes 131. In this embodiment of the screen, shown in FIG. 7, a total of 8 passing holes 131 are arranged on the circumference of the screen 130, with 2 passing holes in each section G1, G2, G3, G4. The center lines X1, X2, X3, X4 of the passing holes 131 in the same section are substantially parallel to each other. That is, the center lines X1 of the 2 passing holes 131 in a first section G1 should be parallel, with the center lines X2 of the 2 passing holes 131 in a second section G2 also being parallel to each other. Likewise, the center lines X3 of the 2 passing holes 131 in a third section G3 are parallel each other, and the center lines X4 of the 2 passing holes 131 in a fourth section G4 are parallel to each other.

As illustrated the above, while the water separated in the first chamber S1 passes through narrow passing holes 131, they are cohered, to flow into the second chamber S2. Accordingly, both the relatively larger and the minute water can be separated, to increase the separation efficiency of the water. Also, minute contaminants are separated in the second chamber S2 through the passing holes 131. As a result, the separation efficiency of minute contaminants is increased.

Figure 8:
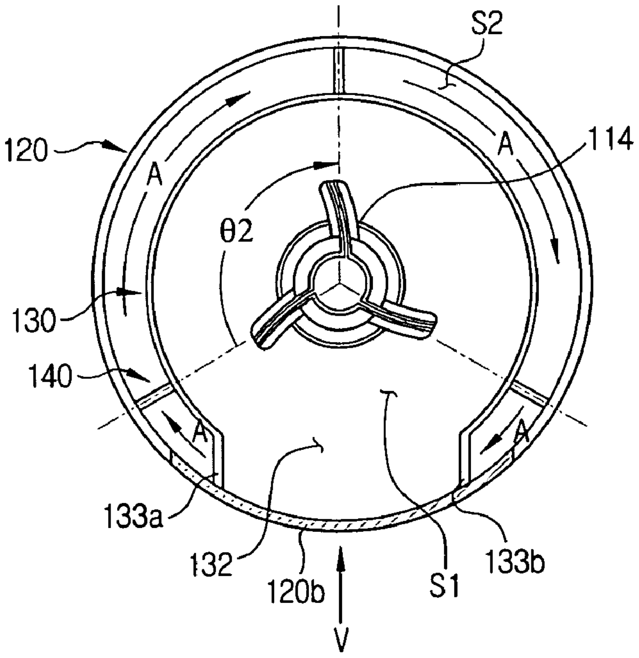
FIG. 8 is a plan view taken along line VIII-VIII of FIG. 1.

Referring to FIGS. 3 and 8, an opening 132 is formed in the lower side 130*c* of the screen 130. Accordingly, a user can observe the amount of separated dust in the first chamber S1 in the direction of arrow V. A hatched part 120*b* of the dust receptacle 120 is made of transparent material so that the user can see inside the first chamber S1 and the second chamber S2 through the opening 132.

In an alternate embodiment, the screen 130 and the dust receptacle 120 may be formed of transparent material for the observance of dust in the first chamber S1, instead of forming the opening 132 as in the above embodiment. However, in order to have a precise determination on the amount of separated contaminants, it is most preferable to form the opening 132 in the screen 130, and to form the hatched part 120*b* of the dust receptacle 120 with transparent material.

Rectangular backflow prevention members 133 may be formed around the opening 132. The rectangular backflow prevention members 133 include a first backflow prevention member 133*a* formed on one side of the opening 132, a second backflow prevention member 133*b* formed on another side of the opening 132, and a third backflow prevention member 133*c* connecting the first and the second backflow prevention members 133*a* and 133*b* from the upper direction. Because the opening 132 is surrounded by the first, second and third backflow prevention members 133*a*, 133*b*, 133*c*, water is prevented from flowing into the first chamber S1 through the opening 132 (see FIG. 1). The presence of first and second backflow prevention members 133*a* and 133*b* also prevents the separated water from continuously rotating in the direction of arrow A.

The guide member 140 is a rectangular rib which partitions the second chamber S2 to more efficiently control the rotation of the collected water. The guide member 140 is disposed between the screen 130 and the dust receptacle 120. More specifically, the guide member 140 may be attached or welded to one, or both sides of the dust receptacle 120 or the screen 130. There may be a plurality of guide members 140 at intervals of θ2. Preferably, three guide members 140 are arranged at intervals of 120°.

The operation of the cyclonic separating apparatus 100 according to one embodiment of the present invention will now be described below.

Referring to FIG. 2, by the suction force of the vacuum cleaner (not shown), air, entrained with contaminants and water, is drawn in the direction of arrow F1 into the first chamber S1 through the air inlet passage 113 and the inlet port 113*a*. As the air is rotated, contaminants and water are separated from the air in the first chamber S1. The larger contaminants are blocked at the passing holes 131 and therefore, separated in the first chamber S1. The water and minute contaminants are passed through the passing holes 131 in the direction of arrow F2 and collected in the second chamber S2. At this time, inclined passing holes 131 prevents both water and minute contaminants from flowing backward into the first chamber S1 through the passing holes 131.

Referring to FIG. 8, both the separated water and minute contaminants are restricted from continuously rotating in the direction of arrow A, due to the presence of the first and second backflow prevention members 133*a* and 133*b* and three guide members 140. As a result, dispersion and subsequent backflow of the water are prevented while the separated water is rotated.

Meanwhile, the user can see the amount of collected contaminants of the first chamber S1 through the hatched transparent part 120*b* and the opening 132 of the dust receptacle 120, and also see the amount of separated water in the second chamber S2 through the hatched transparent part 120*b* of the dust receptacle 120 from the direction of arrow V.

Referring to FIG. 2, air, which is now free of contaminants and water, is discharged through the air discharge passage 113 in the direction of arrow F3, and flows out of the cyclonic separating apparatus 100.

The cyclonic separating apparatus as described above with reference to a few exemplary embodiments of the present invention can provide the following advantages:

First, because contaminants and water are separately collected, the cyclonic separating apparatus can stay clean. Additionally, growth of fungus or germs can be prevented, and therefore, the cyclonic separating apparatus can be hygienic. Also, the problem of dust attaching to the dust receptacle due to water can be prevented, and therefore, dust can be easily disposed.

Secondly, while the water separated from the second chamber passes through narrow passing holes, they are cohered and flow into the first chamber. As a result, both relatively larger as well as minute water particles are separated, increasing the separation efficiency of the water.

Thirdly, the minute contaminants are promptly separated in the first chamber through the passing holes, without being separated from air and continuously rotating in the first chamber S1. As a result, high separation efficiency of minute contaminants is provided.

Fourthly, dispersion and subsequent backflow of separated water can be prevented by the guide members and backflow prevention members. Therefore, filter clogging due to backflow of water can be prevented, and the vacuum cleaner can keep constant suction force and the suction motor can operate without being overloaded.

Finally, a user can see the amount of separated dust and water through the opening of the screen and a transparent part of the dust receptacle. Therefore, the user can easily determine the time for disposal of the separated dust and water.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A cyclonic separating apparatus, comprising:

a cyclone body having an air inlet passage and an air discharge passage;

a dust receptacle connected to a lower end of the cyclone body; and a screen dividing the cyclone body and an interior space of the dust receptacle into a first chamber and a second chamber, the screen having a plurality of passing holes, wherein drawn air rotates in the first chamber and water separated from the air moves to the second chamber through the passing holes.

2. The cyclonic separating apparatus of claim 1, wherein the screen is a cylindrical container, and the passing holes are inclined in the direction of rotation of the drawn air.

3. The cyclonic separating apparatus of claim 2, wherein the passing holes of the screen are formed between a junction of the cyclone body and the dust receptacle, and an inlet port of the air inlet passage.

4. The cyclonic separating apparatus of claim 1, wherein at least one of the passing holes forms an elliptical shape.

5. The cyclonic separating apparatus of claim 1, wherein the screen is surrounded by the cyclone body.

6. The cyclonic separating apparatus of claim 1, wherein the screen is separated into sections, wherein center lines of at least two passing holes disposed in the same section are parallel to each other.

7. The cyclonic separating apparatus of claim 1, wherein an upper most part of the screen is in a funnel shape with an increasing inner diameter in the upward direction.

8. The cyclonic separating apparatus of claim 1, wherein the screen comprises an upper part where the passing holes are formed, and a lower part where the passing holes are not formed.

9. The cyclonic separating apparatus of claim 8, further comprising at least one guide member to partition the second chamber of the dust receptacle so as to restrict rotation of the water once the water is separated into the second chamber.

10. The cyclonic separating apparatus of claim 9, wherein the screen has at least one opening at the lower part, and at least one backflow prevention member formed on the boundary of the opening.

11. The cyclonic separating apparatus of claim 8, further comprising three guide members equally spaced along an inside perimeter of the dust receptacle so as to restrict rotation of the water once the water is separated into the second chamber.

12. The cyclonic separating apparatus of claim 1, wherein the dust receptacle is at least partially formed of a transparent material.

* * * * *